United States Patent
Kim

(10) Patent No.: US 7,373,280 B2
(45) Date of Patent: May 13, 2008

(54) METHOD AND SYSTEM FOR DETECTING MEASUREMENT ERROR

(75) Inventor: Soo-Kwan Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 17 days.

(21) Appl. No.: 11/195,613

(22) Filed: Aug. 3, 2005

(65) Prior Publication Data

US 2006/0100827 A1 May 11, 2006

(30) Foreign Application Priority Data

Nov. 6, 2004 (KR) ............ 10-2004-0090135

(51) Int. Cl.
*G06F 15/00* (2006.01)
(52) U.S. Cl. ............ 702/189; 702/183; 128/920; 600/483; 600/513; 714/48
(58) Field of Classification Search ............ 702/189, 702/183, 19; 600/300, 483, 513, 515; 128/906, 128/908, 920; 703/2; 435/6
See application file for complete search history.

(56) References Cited

U.S. PATENT DOCUMENTS

| | | | | |
|---|---|---|---|---|
| 4,803,625 A | * | 2/1989 | Fu et al. ............ | 600/483 |
| 5,068,536 A | * | 11/1991 | Rosenthal ............ | 250/341.5 |
| 6,095,949 A | * | 8/2000 | Arai ............ | 482/4 |
| 7,113,896 B2 | * | 9/2006 | Zhang et al. ............ | 703/2 |
| 2002/0095260 A1 | * | 7/2002 | Huyn ............ | 702/19 |
| 2005/0010416 A1 | * | 1/2005 | Anderson et al. ............ | 704/271 |
| 2005/0113650 A1 | * | 5/2005 | Pacione et al. ............ | 600/300 |
| 2005/0170378 A1 | * | 8/2005 | Yakhini et al. ............ | 435/6 |

* cited by examiner

*Primary Examiner*—John Barlow
*Assistant Examiner*—Hien Vo
(74) *Attorney, Agent, or Firm*—Staas & Halsey LLP

(57) ABSTRACT

A method of and system for detecting a measurement error. The method includes: receiving measurement data from a measurement unit and user expression data from a user; corresponding each of the received measurement data and expression data to any one section of a plurality of sections; and checking whether or not the corresponding two sections are consistent with each other, to detect an error of any one of the measurement data and the expression data when they are not consistent. The system includes: a measurement unit for measuring measurement data; a user inputting unit for receiving expression data from a user; a memory for storing a plurality of sections classifying values of the measurement data and the expression data; a section detecting unit for corresponding each of the measurement data and the expression data to any one of the stored plurality of sections; and an error detecting unit for checking whether or not the corresponding two sections are consistent, to detect an error of any one of the measurement data and the expression data when they are not consistent.

12 Claims, 3 Drawing Sheets

| SECTION | MEASUREMENT DATA (CONSUMPTION CALORIE) | EXPRESSION DATA |
|---------|----------------------------------------|-----------------|
| 1 | LESS THAN 100 CALORIES | NO EXERCISE |
| 2 | 100 TO 300 CALORIES | LIGHT EXERCISE |
| 3 | 300 TO 500 CALORIES | MODERATE EXERCISE |
| 4 | 500 TO 800 CALORIES | SUFFICIENT EXERCISE |
| 5 | MORE THAN 800 CALORIES | EXCESSIVE EXERCISE |

FIG. 3

| SECTION | MEASUREMENT DATA (CONSUMPTION CALORIE) | EXPRESSION DATA |
|---|---|---|
| 1 | LESS THAN 100 CALORIES | NO EXERCISE |
| 2 | 100 TO 300 CALORIES | NO EXERCISE |
| 3 | 300 TO 500 CALORIES | LIGHT EXERCISE |
| 4 | 500 TO 800 CALORIES | MODERATE EXERCISE |
| 5 | MORE THAN 800 CALORIES | SUFFICIENT EXERCISE |

METHOD AND SYSTEM FOR DETECTING MEASUREMENT ERROR

CROSS-REFERENCE TO RELATED APPLICATION

This application claims the benefit of Korean Patent Application No. 2004-0090135, filed on Nov. 6, 2004, in the Korean Intellectual Property Office, the disclosure of which is incorporated herein by reference.

BACKGROUND OF THE INVENTION

1. Field of the Invention

The present invention relates to a method of and system for detecting a measurement error, and more particularly, to a method of and system for detecting a measurement error in which measurement unit data and user expression data for the same environment or the same item are cross-checked to detect a measurement error, thereby warning a user or providing the user with feedback information depending on the detected measurement error.

2. Description of Related Art

Recently, as concerns about personal health have increased, many people have begun to enjoy regular exercise such as running, walking and the like so as to maintain health. During exercise, an exerciser often desires to know exactly how much exercise he or she has accomplished by measuring for example, calorie consumption. Accurate measures of such information help an exerciser meter his or her exercise and thus maintain his or her health.

Accordingly, measurement devices for simply and conveniently measuring an exercise amount such as calorie consumption have been recently manufactured and used. However, the measurement devices have a drawback in that when measurement data such as calorie consumption has an error, a health management based on the measurement data is deteriorated.

BRIEF SUMMARY

An aspect of the present invention provides a method and system for detecting a measurement error in which a measurement unit data and a user expression data are cross-checked to detect the measurement error, thereby warning a user and providing the user with feedback information suitable to a personal characteristic.

According to an aspect of the present invention, there is provided a method of detecting a measurement error, the method including: receiving measurement data from a measurement unit and user expression data; relating each of the received measurement data and expression data to corresponding ones of a plurality of sections, based on values of the received measurement data and expression data; and checking whether the data corresponding to the sections to which the measurement and expression data are related are consistent with each other, to detect an error in the measurement data or the expression data when the data are not consistent.

The method may further include warning the user of the detected error.

The method may further include generating user feedback information on the basis of the detected error.

The error detecting may include: checking whether or not the corresponding two sections are consistent with each other; in case where the two sections are not consistent, receiving remeasurement data from the measurement unit; and comparing the measurement data with the remeasurement data, to determine that the measurement unit has an error in case where the measurement data and the remeasurement data are not consistent, and determine that the user has an error in case where the measurement data and the remeasurement data are consistent.

The method may further include: resetting sections of a measurement data or sections of an expression data depending on the detected error, or resetting sections of a measurement data or sections of an expression data to allow the corresponding measurement data section and expression data section to be consistent with each other.

The plurality of sections may be set for each user.

According to another aspect of the present invention, there is provided a system for detecting a measurement error, the system including: a measurement unit measuring measurement data; a user inputting unit receiving expression data; a memory storing a plurality of sections classifying values of the measurement data and the expression data; a section detecting unit relating each of the measurement data and the expression data to ones of the stored plurality of sections, depending on the values of the measurement and expression data; and an error detecting unit checking whether the data corresponding to the sections to which the measurement and expression data are related are consistent, to detect an error of the measurement data or the expression data the data are not consistent.

The system may further include a warning unit for warning the user of the detected error, or a feedback generating unit for generating user feedback information on the basis of the detected error.

The system may further include a section setting unit for resetting sections of a measurement data or sections of an expression data, depending on the detected error.

The error detecting unit may check whether or not the corresponding two sections are consistent with each other, to control the measurement unit to generate remeasurement data in case where they are not consistent, and compares the remeasurement data with the measurement data to determine that the measurement unit has the error in case where they are not consistent and determine that the user has the error in case where they are consistent.

The memory may store the plurality of sections classifying the values of the measurement data and the expression data.

According to a further another aspect of the present invention, there is provided an apparatus for detecting a measurement error, the system including: a data inputting unit receiving measurement data from a measurement unit and expression data; a memory storing a plurality of sections classifying values of the measurement data and the expression data; a section detecting unit relating each of the measurement data and the expression data to ones of the stored plurality of sections, depending on the values of the measurement and expression data; and an error detecting unit checking whether the data corresponding to the sections to which the measurement and data are related are consistent, to detect an error of the measurement data or the expression data when the data are not consistent.

The system may further include a warning unit for warning the user of the detected error, or a feedback generating unit for generating user feedback information on the basis of the detected error.

The system may further include a section setting unit for resetting sections of a measurement data or sections of an expression data, depending on the detected error.

According to another aspect of the present invention, there is provided a method of detecting a measurement error, including: measuring an environment or an item to obtain first measurement data; receiving expression data for environment or item; matching each of the measurement data and the expression data to ones of a plurality of sections; cross-checking the first measurement data with the expression data corresponding to the sections to which the measurement and expression data are matched to determine whether the data are consistent; remeasuring the environment or item to obtain second measurement data when the received measurement data and expression data are not consistent; checking whether the second measurement data is consistent with the first measurement data; and determining that the first measurement data does not have an error and that the user expression data has an error when the second measurement data is consistent with the first measurement data.

According to other aspects of the present invention, there are provided computer-readable storage media encoded with processing instructions for performing methods of the invention, including the aforementioned methods.

Additional and/or other aspects and advantages of the present invention will be set forth in part in the description which follows and, in part, will be obvious from the description, or may be learned by practice of the invention

BRIEF DESCRIPTION OF THE DRAWINGS

These and/or other aspects and advantages of the present invention will become apparent and more readily appreciated from the following detailed description, taken in conjunction with the accompanying drawings of which:

FIG. 3 is a table illustrating an example of a plurality of data sections reset by the section setting unit of FIG. 1.

DETAILED DESCRIPTION OF EMBODIMENTS

Figures 1, 2:
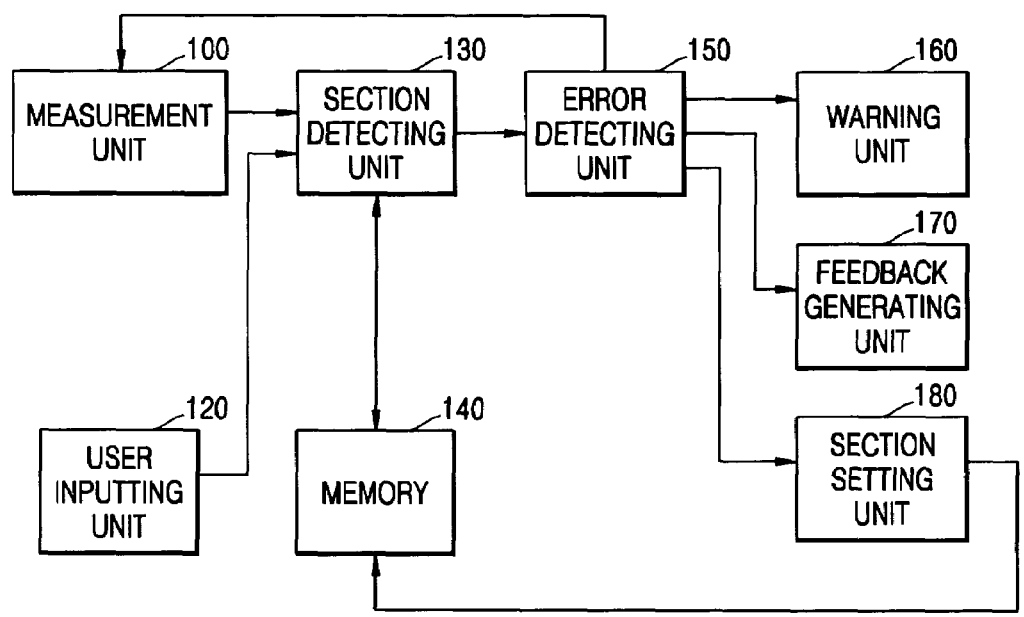
FIG. 1 is a block diagram illustrating a system for detecting a measurement error according to an embodiment of the present invention.
FIG. 2 is a table illustrating an example of a plurality of data sections corresponding to measurement data and expression data.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a construction of a system for detecting a measurement error according to an embodiment of the present invention.

The detecting system includes a measurement unit 100, a user inputting unit 120, a section detecting unit 130, a memory 140, an error detecting unit 150, a warning unit 160, a feedback generating unit 170, and a section setting unit 180.

Figure 4:
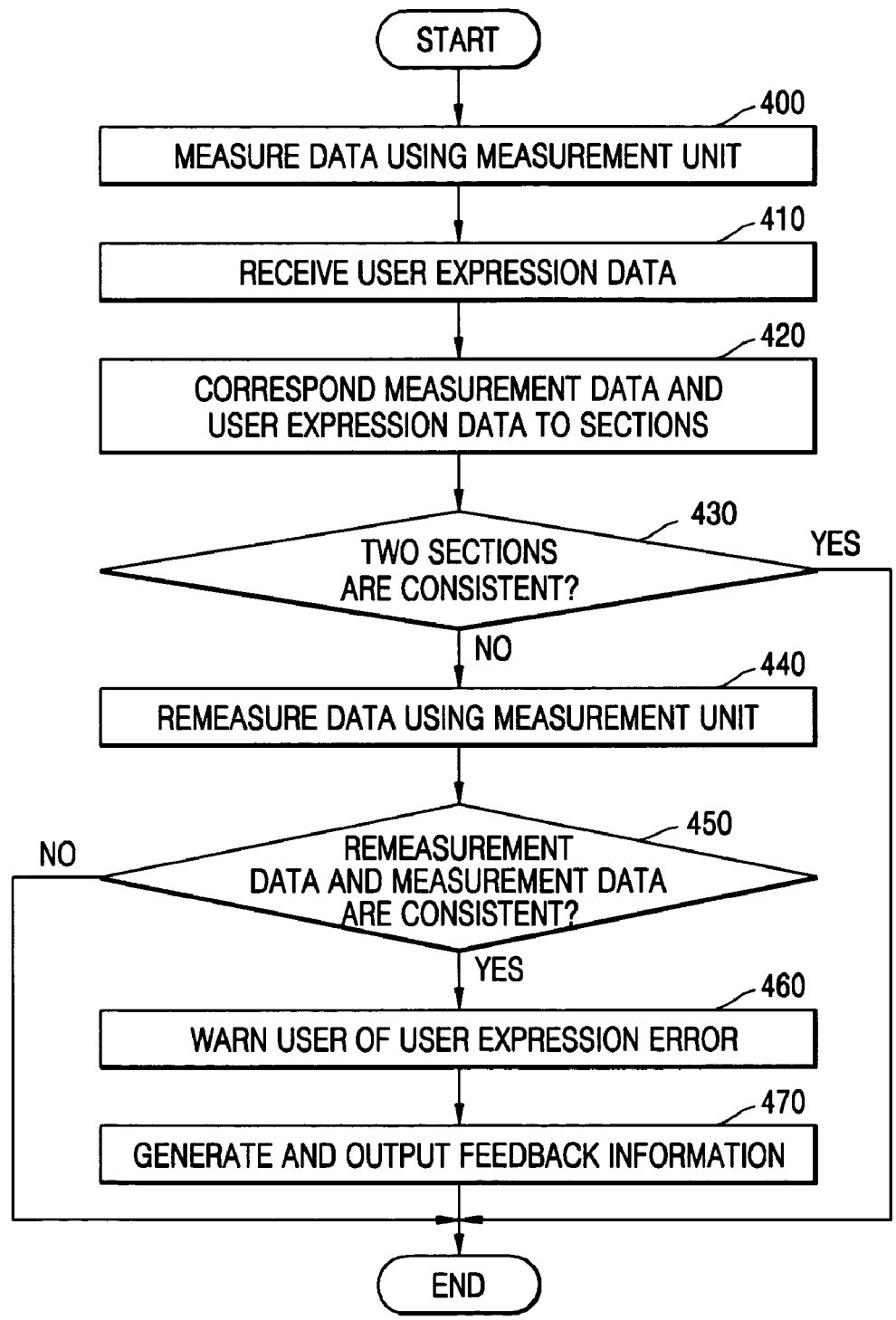
FIG. 4 is a flowchart illustrating a method of detecting a measurement error according to an embodiment of the present invention.

An operation of the system of FIG. 1 is described with reference to a flowchart of FIG. 4 illustrating a method for detecting the measurement error according to an embodiment of the present invention. Because the method of FIG. 4 can be performed by the system of FIG. 1, the system and method are, for ease of explanation only, explained in conjunction with each other. However, it is to be understood that performance of the method of FIG. 4 is not limited to the system of FIG. 1, and vice-versa.

The measurement unit 100 measures an amount of user's calorie consumption to output measurement data (S400). The user inputting unit 120 receives a user expression data for the same target and item as those measured by the measurement unit 100, from a user (S410). The memory 140 divides the measurement data and the expression data into a plurality of sections and stores the divided sections. The section detecting unit 130 corresponds (i.e., relates or matches) each of the measurement data of the measurement unit 100 and the expression data of the user inputting unit 120, to one of the stored plurality of sections (S420).

The stored plurality of sections may be initially identically set to all users, or be initially set depending on physical information on user's sex, age, weight or the like. After the detecting system is used by a specific user for a predetermined period, the sections may be reset suitably to a user's personal characteristic and stored in the memory 140.

FIG. 2 illustrates a table of the plurality of sections corresponding to the measurement data and the expression data stored in the memory 140. The amount of user's calorie consumption measured by the measurement unit 100 is divided into five sections, and an expression for a user's exercise amount is divided into five sections and received from the user through the user inputting unit 120. When the amount of the user's calorie consumption is measured as 350 calories by the measurement unit 100 and the expression of the user's exercise amount is received as "light exercise" by the user inputting unit 120 as shown in the set sections, the section detecting unit 130 reads the sections of the measurement data and the expression data from the memory 140 to output the measurement data corresponding to a third section and the expression data corresponding to a second section.

The error detecting unit 150 receives the measurement data and the expression data corresponding to the two sections from the section detecting unit 130, to check whether or not the received measurement data and expression data corresponding to the received measurement data and expression data are consistent with each other (S430). When the received measurement data and expression data are not consistent, the error detecting unit 150 sends a remeasurement signal to the measurement unit 100 so that the measurement unit 100 remeasures the same target and item as those measured in the step 400 to output remeasurement data (S440).

The error detecting unit 150 checks whether or not the remeasurement data is consistent with the measurement data (S450). When the remeasurement data is consistent with the measurement data, the error detecting unit 150 determines that the measurement data does not have the error and the user expression data is erroneously different from real data, to output expression data error information. The warning unit 160 receives the expression data error information to warn the user (S460). The warning unit 160 may include a voice processing unit or a display unit to audibly warn the user or display a user expression error on a screen. Further, the warning unit 160 may provide the user with measurement data information and at the same time, warn the user of the user expression error.

When the measurement data is not consistent with the remeasurement data, the error detecting unit 150 may inform the user through the warning unit 160 that measurement is erroneously performed. Or, when the measurement data is not consistent with all of the remeasurement data obtained by repeating remeasurement through the measuring unit 100, the error detecting unit 150 may inform the user through the warning unit 160 that the measurement unit 100 is required for repair.

When the error detecting unit 150 determines that the user expression data has the error, the feedback generating unit 170 generates and provides feedback information, which is suitable to the user expression error, to the user (S470). The feedback information depending on the expression data error may be previously generated and stored in a feedback memory (not shown). An example of the feedback information is described with reference to the table of FIG. 2. When the measurement data is provided at a second section and the user expression data is provided at a fourth section, the feedback generating unit 170 may provide the user with a message of "Please take a little more exercise for goal achievement. Lack of 400 calories. More jogging for thirty minutes!".

Since the corresponding sections of the measurement data and the expression data initially stored in the memory 140 does not include the user's personal characteristic, the error or feedback information of the measurement data or the expression data may not be provided suitably to each of the users. For example referring to the table of FIG. 2, when a user "A" completes exercise consuming 400 calories, it can be determined to be a moderate exercise, even though for a user "B" completes exercise consuming the same 400 calories as those of the user "A", it can be determined to be a light exercise. When the error is continuously detected using the sections initially set to the memory 140, the user "B" is continuously warned that the user expression data has the error.

The section setting unit 180 resets the sections corresponding to a measurement data and an expression data stored in the memory 140 on the basis of the detected errors of the measurement data and the expression data. The section setting unit 180 stores the detected errors in an error memory (not shown). In such a state that the detected errors are stored, when the same error is repeated, the section setting unit 180 may set the stored sections so that the measurement data section and the expression data section having the detected errors are consistent with each other.

FIG. 3 is a table illustrating an example of the plurality of data sections reset by the section setting unit 180 of FIG. 1, and resets the sections of FIG. 2. The user "B" repeats to input the expression data of "light exercise" after completing exercise consuming 400 calories, and repeats to input the expression data of "moderate exercise" after completing exercise consuming above 800 calories, thereby storing the expression data errors in the error memory (not shown). As shown in FIG. 3, the section setting unit 180 shifts the expression data by one section to store the shifted expression data in the memory 140 so that the measurement data section and the expression data section of the user "B" are consistent with each other. As described above, as the reset result, the measurement data section and the expression data section of the user "B" are consistent with each other.

The section setting unit 180 may reset the sections for a plurality of users in the above method to store the reset sections in the memory 140 for each of the users.

According to the above-described embodiments of the present invention, in a method of and system for detecting the measurement error, the measurement unit data and the user expression data for the same environment or the same item are cross-checked to detect the measurement error and to warn the user or provide the feedback information depending on the detected measurement error so that the measurement data and its feedback information suitable to the user's personal characteristic are provided for a health management in which exact management is difficult when only the measurement device data or the user expression data is used.

Embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of detecting a measurement error, the method comprising:
   receiving measurement data from a measurement unit and user expression data;
   relating each of the received measurement data and expression data to corresponding ones of a plurality of sections classifying values of the measurement data and the expression data, based on values of the received measurement data and expression data; and
   checking whether the data corresponding to the sections to which the measurement and expression data are related are consistent with each other, to detect an error in the measurement data or the expression data when the data are not consistent,
   wherein the error detecting includes
      checking whether the data in the sections to which the measurement and expression data are related are consistent with each other;
      receiving remeasurement data from the measurement unit when the data of the sections to which the measurement and expression data are related are not consistent; and
      comparing the measurement data with the remeasurement data, to determine that the measurement unit has an error when the measurement and remeasurement data are not consistent, and to determine that the user expression data has an error when the measurement and remeasurement data are consistent.

2. The method of claim 1, further comprising warning a user of a detected error.

3. The method of claim 1, further comprising generating user feedback information on the basis of a detected error.

4. The method of claim 1, further comprising resetting sections of a measurement data or sections of an expression data depending on a detected error.

5. The method of claim 1, further comprising resetting sections of a measurement data or sections of an expression data to render a measurement data section and a related expression data section consistent with each other.

6. The method of claim 1, wherein the plurality of sections are set for each user.

7. A system for detecting a measurement error, the system comprising:
- a measurement unit measuring measurement data;
- a user inputting unit receiving expression data;
- a memory storing a plurality of sections classifying values of the measurement data and the expression data;
- a section detecting unit relating each of the measurement data and the expression data to ones of the stored plurality of sections, depending on the values of the measurement and expression data; and
- an error detecting unit checking whether the data corresponding to the sections to which the measurement and expression data are related are consistent, to detect an error of the measurement data or the expression data the data are not consistent,
- wherein the error detecting unit checks whether the data corresponding to the sections to which the measurement and expression data are related are consistent with each other, to control the measurement unit to generate remeasurement data when the measurement and expression data are not consistent, and compares the remeasurement data with the measurement data to determine that the measurement unit has the error when the measurement and remeasurement data are not consistent and to determine that the expression data has the error when the measurement and remeasurement data are consistent.

8. The system of claim 7, further comprising a warning unit warning a user of a detected error.

9. The system of claim 7, further comprising a feedback generating unit generating user feedback information on the basis of an detected error.

10. The system of claim 7, further comprising a section setting unit resetting sections of the measurement data or sections of the expression data, depending on a detected error.

11. The system of claim 7, wherein the measurement unit measures calorie consumption.

12. A computer-readable storage medium encoded with instructions for causing a processor to perform a method of detecting a measurement error, the method comprising:
- receiving measurement data from a measurement unit and user expression data;
- relating each of the received measurement data and expression data to corresponding ones of a plurality of sections classifying values of the measurement data and the expression data, based on values of the received measurement data and expression data; and
- checking whether the data corresponding to the sections to which the measurement and expression data are related are consistent with each other, to detect an error in the measurement data or the expression data when the data are not consistent,
- wherein the error detecting includes
  - checking whether the data in the sections to which the measurement and expression data are related are consistent with each other;
  - receiving remeasurement data from the measurement unit when the data of the sections to which the measurement and expression data are related are not consistent; and
  - comparing the measurement data with the remeasurement data, to determine that the measurement unit has an error when the measurement and remeasurement data are not consistent, and to determine that the user expression data has an error when the measurement and remeasurement data are consistent.

* * * * *

UNITED STATES PATENT AND TRADEMARK OFFICE
CERTIFICATE OF CORRECTION

| | |
|---|---|
| PATENT NO. | : 7,373,280 B2 |
| APPLICATION NO. | : 11/195613 |
| DATED | : May 13, 2008 |
| INVENTOR(S) | : Soo-Kwan Kim |

Page 1 of 1

It is certified that error appears in the above-identified patent and that said Letters Patent is hereby corrected as shown below:

Column 7, Line 32, after "of" change "an" to --a--.

Signed and Sealed this

Seventh Day of October, 2008

JON W. DUDAS
*Director of the United States Patent and Trademark Office*